US008943155B2

(12) United States Patent
Fields et al.

(10) Patent No.: US 8,943,155 B2
(45) Date of Patent: *Jan. 27, 2015

(54) WORKFLOW AND IN-CONTEXT E-MAIL RECIPIENT HANDLING

(71) Applicant: Microsoft Corporation, Redmond, WA (US)

(72) Inventors: Brendan C. Fields, Woodinville, WA (US); Diana J. Schwend, Seattle, WA (US); Jorge Pereira, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/772,671

(22) Filed: Feb. 21, 2013

(65) Prior Publication Data

US 2013/0166663 A1    Jun. 27, 2013

Related U.S. Application Data

(63) Continuation of application No. 11/315,408, filed on Dec. 22, 2005, now Pat. No. 8,402,093.

(51) Int. Cl.
*G06F 15/16* (2006.01)
*G06F 3/048* (2013.01)
*H04L 12/58* (2006.01)
*G06Q 10/10* (2012.01)

(52) U.S. Cl.
CPC .............. *H04L 51/36* (2013.01); *G06Q 10/107* (2013.01); *G06F 3/048* (2013.01)
USPC ........................................... 709/206; 715/816

(58) Field of Classification Search
CPC ............................... G06F 17/30; G06F 17/276
USPC ........................... 709/204–207; 715/816–818
See application file for complete search history.

(56) References Cited

U.S. PATENT DOCUMENTS 5,542,088 A    7/1996  Jennings, Jr. et al.
5,923,848 A    7/1999  Goodhand et al.
(Continued)

OTHER PUBLICATIONS

Non-final Office Action in U.S. Appl. No. 11/315,408, Mailed Date: Mar. 13, 2009, Filed Date: Dec. 22, 2005, 8 Pages.
(Continued)

*Primary Examiner* — Chirag R Patel
(74) *Attorney, Agent, or Firm* — Louise Bowman; Jim Ross; Micky Minhas (57) ABSTRACT

Various technologies and techniques are disclosed that improve the workflow process for resolving data elements, such as email addresses. These technologies and techniques allow the user to perform such tasks in the same context as the activity or message. In addition, user can start and stop the resolution process at any point in the process of composing the activity or email. The activity cannot be finalized, such as an email message being sent, until all of the data elements are resolved.

20 Claims, 11 Drawing Sheets

(56) References Cited

U.S. PATENT DOCUMENTS

| | | | |
|---|---|---|---|
| 6,360,252 B1 | 3/2002 | Rudy et al. | |
| 6,542,170 B1 | 4/2003 | Williams et al. | |
| 6,734,881 B1 | 5/2004 | Will\ | |
| 6,829,607 B1 | 12/2004 | Tafoya et al. | |
| 7,035,921 B1 | 4/2006 | Baker | |
| RE39,326 E * | 10/2006 | Comer et al. | 715/203 |
| 7,583,671 B2 | 9/2009 | Ramani et al. | |
| 2002/0021311 A1 | 2/2002 | Shechter et al. | |
| 2006/0106793 A1 | 5/2006 | Liang | |

OTHER PUBLICATIONS

Non-final Office Action in U.S. Appl. No. 11/315,408, Mailed Date: Apr. 13, 2010, Filed Date: Dec. 22, 2005, 12 Pages.
Final Office Action in U.S. Appl. No. 11/315,408, Mailed Date: Sep. 18, 2009, Filed Date: Dec. 22, 2005, 11 Pages.
Final Office Action in U.S. Appl. No. 11/315,408, Mailed Date: Oct. 19, 2010, Filed Date: Dec. 22, 2005, 22 Pages.
Notice of Allowance in U.S. Appl. No. 11/315,408, Mailed Date: Nov. 19, 2012, Filed Date: Dec. 22, 2005, 7 Pages.

* cited by examiner

WORKFLOW AND IN-CONTEXT E-MAIL RECIPIENT HANDLING

CROSS-REFERENCE TO RELATED APPLICATIONS

The present application is a continuation of U.S. patent application Ser. No. 11/315,408 (now U.S. Pat. No. 8,402,093), filed on Dec. 22, 2005, the entirety of which is incorporated by reference herein.

BACKGROUND

Email can be accessed and used at the workplace through various software programs and company servers or remotely viasa a web access program. Email accounts on home computers can be accessed through a software program such as MICROSOFT® Office OUTLOOK®, or from a web-access program, such as MICROSOFT® Office OUTLOOK® Web Access (OWA). Present email utilities can contain a feature whereby the user can partially enter an email address and the system automatically completes the entry, based on available data. Problems can arise when a user enters an email address that the system does not recognize.

Current technologies attempt to reconcile ambiguous or unrecognized email addresses by redirecting the user to a different interface. Current processes are cumbersome and can be confusing. Methods for data entry, searches, confirmation, and other conventions used in the interface may vary from that of the email program. In addition, once the process starts, the user must remain in that interface until all ambiguous or questionable email addresses are resolved. The user cannot leave the interface to begin work on the email message until all address ambiguities are resolved.

SUMMARY

Various technologies and techniques are disclosed that improve the process for resolving data elements, such as email addresses. Some or all of these technologies and techniques can improve the speed and ease with which users can complete the resolution process, as well as perform the task within the same context as the rest of the program or activity. The user can remain in the program or activity without needing to move to a different screen. Furthermore, the user can start and stop the process as desired. By way of example and not limitation, the user can compose part or all of an email message before completing the resolution process. Non-limiting examples of this technology can be used to resolve other ambiguities, including those in non-email applications. As one non-limiting example, the process for scheduling rooms could be resolved using the same technology and techniques. These technologies and techniques can be used with other software programs, such as mapping applications, travel guides, or programs that evaluate patient names/data.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves the workflow process for resolving data elements, such as email addresses, but the system also serves other purposes in addition to these. In one implementation, one or more of the techniques described herein can be implemented as features within an email program such as MICROSOFT® Office OUTLOOK®, MICROSOFT® Office OUTLOOK® Web Access (OWA), AOL Anywhere, or from any other type of program or service that allows creation of email messages. In another implementation, one or more of the techniques described herein are implemented as features with other applications that deal with data elements that need resolved, such as conference rooms, postal addresses, and/or patient data, to name a few non-limiting examples. In one implementation, a user enters a particular data element, such as a plain text name, and the system attempts to resolve that data element to an identifier associated with the particular element, such as an email address. In another implementation, the user enters a particular data element and the system attempts to resolve that data element to make sure it matches something that exists.

Figure 1:
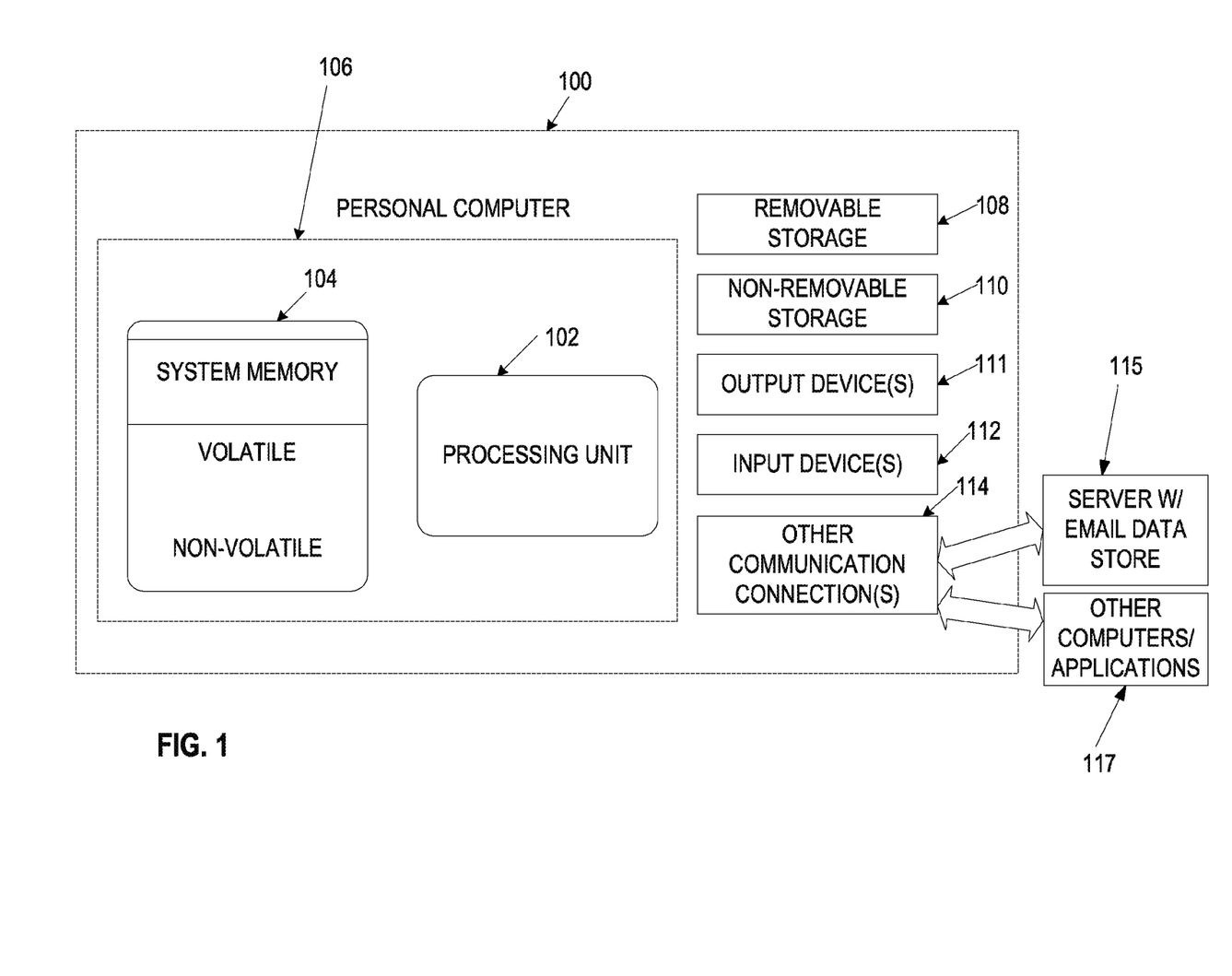
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with one or more servers, such as server with email data store 115. Computing device 100 may also communicate with one or more computers and/or applications 117. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

Figure 2:
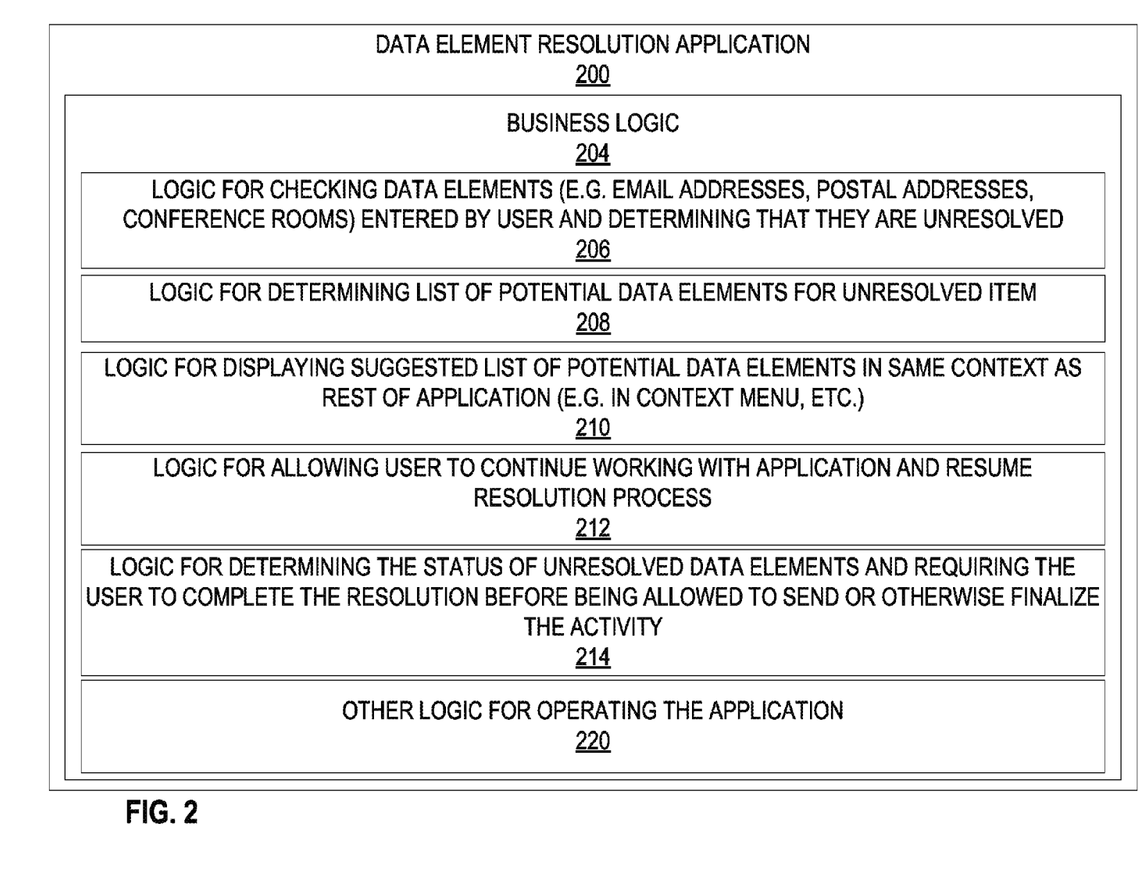
FIG. 2 is a diagrammatic view of a data element resolution application of one implementation operating on the computer system of FIG. 1.

Turning now to FIG. 2 with continued reference to FIG. 1, an data element resolution application 200 operating on computing device 100 is illustrated. Data element resolution application 200 is one of the application programs that reside on computing device 100. Alternatively or additionally, one or more parts of data element resolution application 200 can be part of system memory 104, on other computers and/or servers 115, or other such variations as would occur to one in the computer software art.

Data element resolution application 200 includes business logic 204, which is responsible for carrying out some or all of the techniques described herein. Business logic 204 includes logic for checking data elements entered by the user and determining whether they are unresolved 206, logic for determining a list of potential data elements for unresolved item(s) 208, logic for displaying a suggested list of potential data elements in the same context with rest of the application 210, logic for allowing the user to continue working with the activity and resume the resolution process later 212, logic for prompting the user with viable options for resolution 214, and other logic for operating the application 220. In one implementation, business logic 204 is operable to be called programmatically from another program, such as using a single call to a procedure in business logic 204.

In one implementation, business logic 204 resides on computing device 100. However, it will be understood that business logic 204 can alternatively or additionally be embodied as computer-executable instructions on one or more computers and/or in different variations than shown on FIG. 2. Alternatively or additionally, one or more parts of data element resolution application 200 can be part of system memory 104, on other computers and/or applications 117, or other such variations as would occur to one in the computer software art.

The examples presented herein illustrate using these technologies and techniques with an email application in one implementation. However, as discussed previously, in other implementations these technologies and techniques are used with other systems for resolving other types of data elements, such as postal addresses, conference rooms, patient records, etc.

Figure 3:
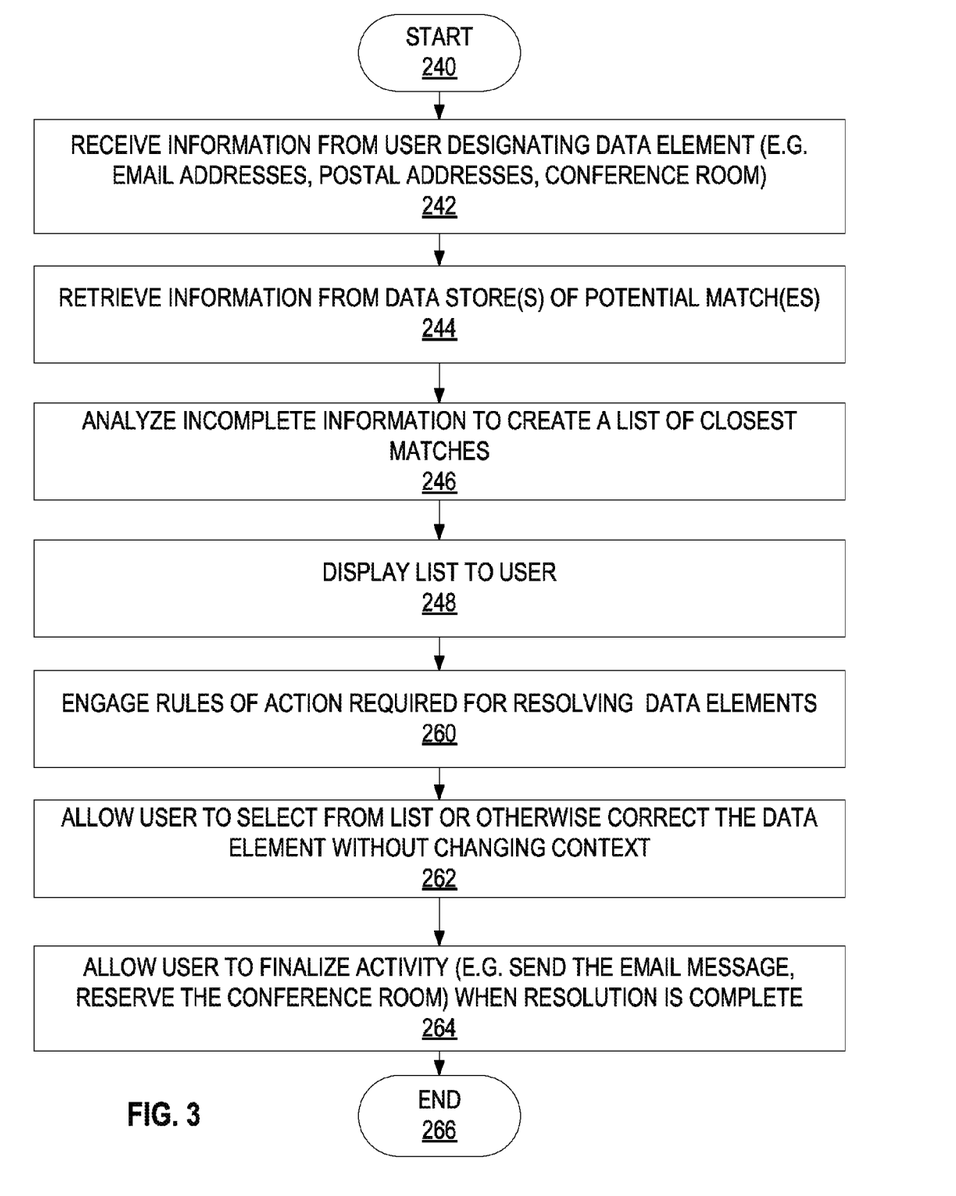
FIG. 3 is a high-level process flow diagram for one implementation of the system of FIG. 1.
Figure 4:
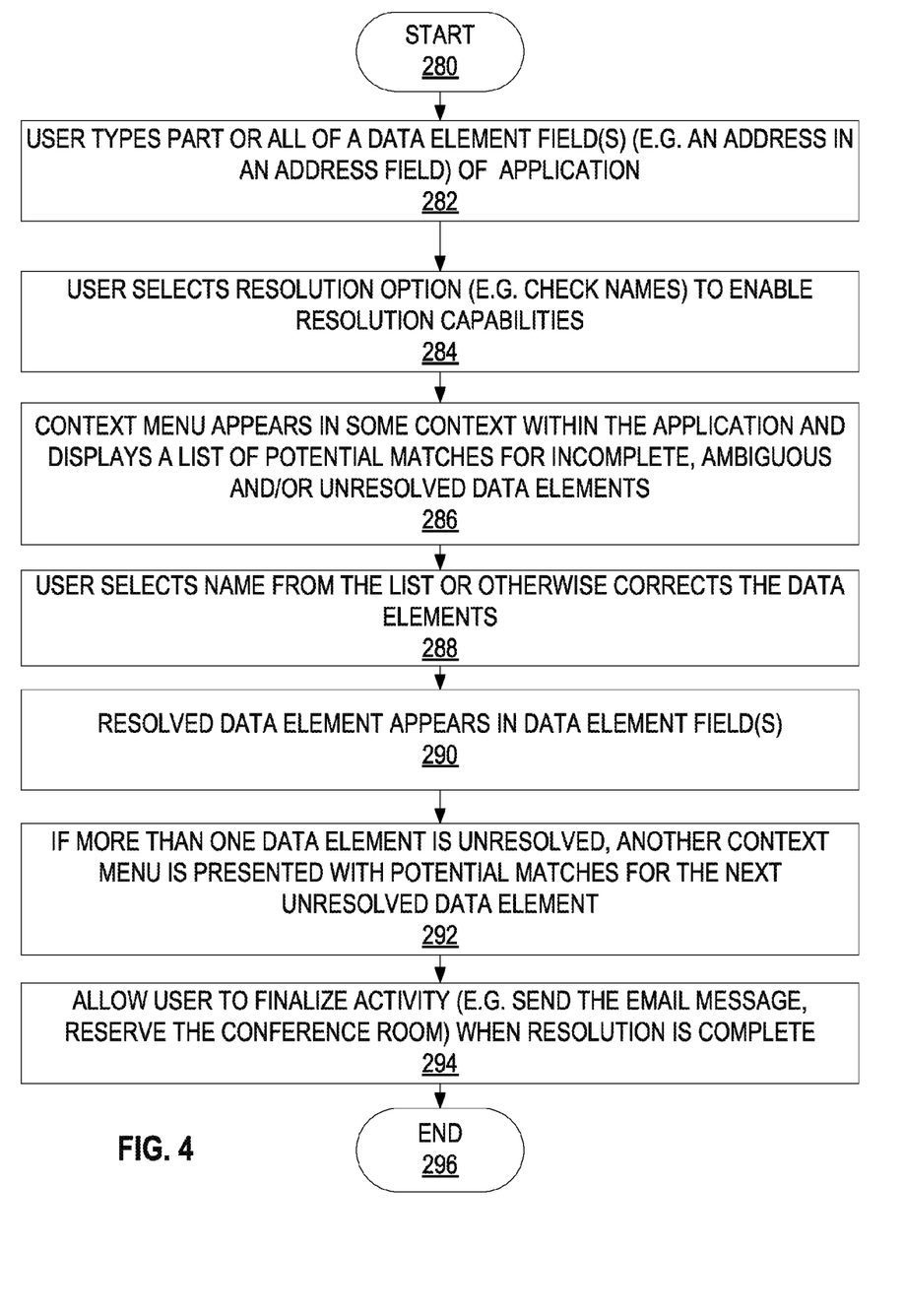
FIG. 4 is a process flow diagram for one implementation of the system of FIG. 1 illustrating the stages involved in resolving data elements.

Turning now to FIGS. 3-4 with continued reference to FIGS. 1-2, the stages for implementing one or more implementations of data element resolution application 200 are described in further detail. FIG. 3 is a high level process flow diagram for data element resolution application 200. In one form, the process of FIG. 3 is at least partially implemented in the operating logic of computing device 100.

The procedure begins at start point 240 with analyzing information the user inputs into one or more data element fields (stage 242), such as an email address entered into an address field in an email message. The system attempts to retrieve existing information from one or more data stores (stage 244). Data stores can include, but are not limited to, databases, files on a local and/or remote computer, and/or other data storage systems. As one non-limiting example, email addresses are retrieved from one or more central data stores of stored information known as "contacts." Separate data stores can contain global and personal contact information. One example of a data store for global contacts is the email addresses for all employees in a company. Another non-limiting example of contacts is email information that each employee can enter into a personal contacts repository. Such original data sources can be used to obtain information, which can then be used by data element resolution application 200. In another implementation, data elements are retrieved by data element resolution application 200 when accessed via a web server over the Internet.

The information is analyzed (stage 246) and compared to user input. Information regarding potential matches is grouped together appropriately and displayed as a context menu (stage 248) within the application. Other types of menus or dialogs that allow the user to remain in the same context in the application and select a particular operation could also be used. The context menu includes one or more options of appropriate action to take to resolve an ambiguous data element (stage 260). When the user completes a valid action, resolution for that data element is complete (stage 264). The process ends at point 266.

FIG. 4 illustrates one implementation of a more detailed process for resolving data elements. In one form, the process of FIG. 4 is at least partially implemented in the operating logic of computing device 100. The procedure begins at start point 280 with the user entering part or all of an address into one or more data element fields (stage 282). The user engages the resolution process (stage 284), which cues the system to compare the user's entries with data elements stored locally on the computing device 100 or remotely on a server 115. In one implementation, the resolution process is engaged when the user selects a resolve option, such as upon selecting a check names option.

In another implementation, the resolution process is engaged as the user types an address in the address field. Other variations are also possible for controlling how the user engages the resolution process. The presence of one or more ambiguous data elements causes a context menu to appear within the user's application (stage 286). The user reconciles the discrepancy by selecting from a list of close matches or by otherwise resolving the discrepancy (stage 288). The selected or keyed name replaces the ambiguous name in the address field (stage 290). If more than one data element is ambiguous, the process is repeated (stage 292) until all data elements are resolved. Then the user is allowed to finalize the activity, such as send the email, when the resolution process is complete (stage 294). The process ends at end point 296.

Figure 5:
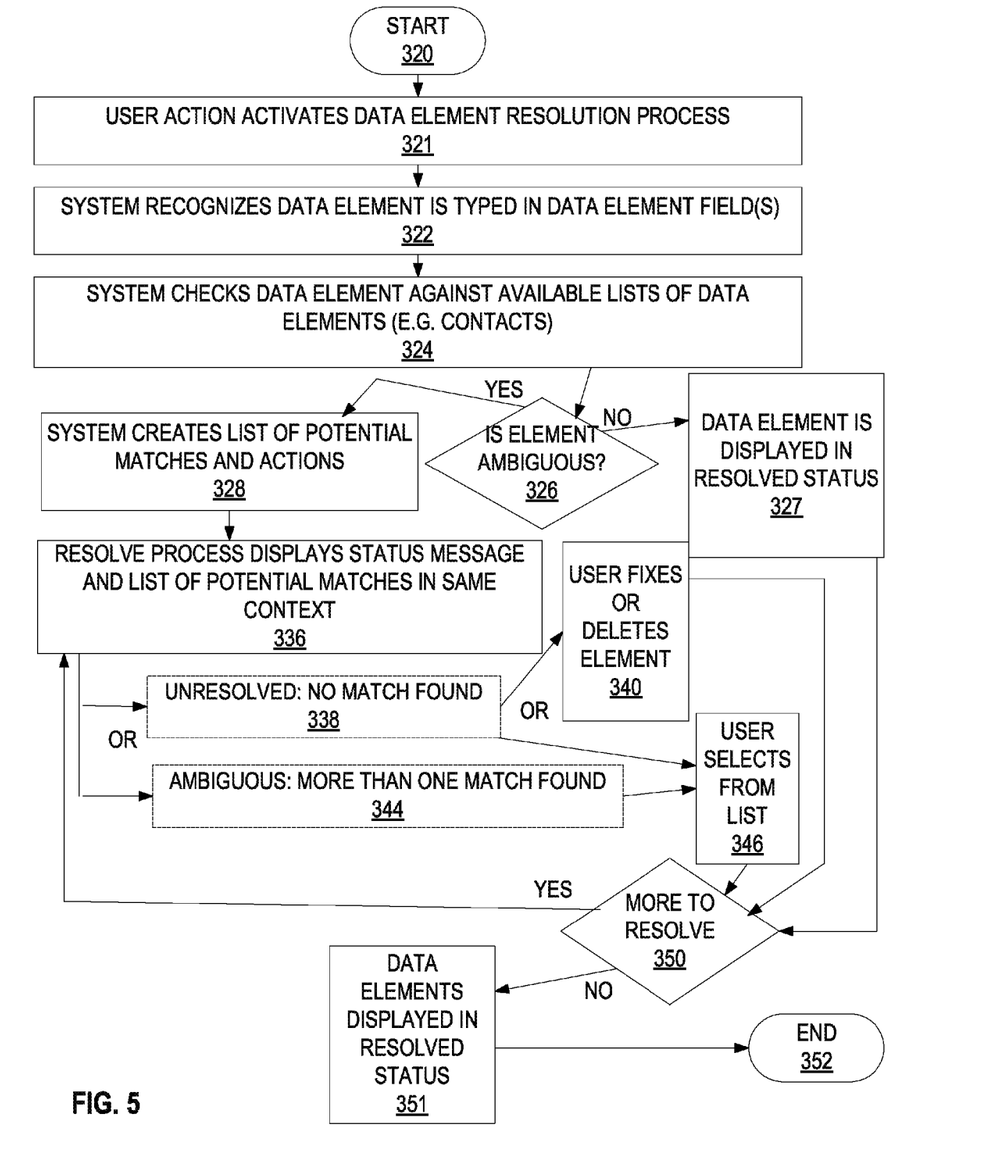
FIG. 5 is a process flow diagram for one implementation of the system of FIG. 1 illustrating the stages involved in resolving data elements based on various status identifiers.

FIG. 5 illustrates the stages involved in resolving data elements based on particular status identifiers in one implementation. In one form, the process of FIG. 5 is at least partially implemented in the operating logic of computing device 100. The user performs an action that activates the address resolution process (stage 321). The system recognizes user input into one or more address fields (stage 322). The system compares the input to available data stores of data elements (e.g. contacts) (stage 324) and determines if the user entry is ambiguous or is an exact match to one address in the data stores (decision point 326). If the address is not ambiguous because an exact match is found, the address is displayed in a resolved status (stage 327) and the system checks to see if there are any other data elements to resolve (decision point 350).

If the address is ambiguous and no exact match is found (decision point 326), the system uses business logic 208 to generate a list of potential matches and appropriate actions to take (stage 328). The system displays a status message, a list of potential matches, and/or options for appropriate actions in a context menu in the same context as the rest of the application (stage 336). If the status is unresolved because no match was found (stage 338) the user resolves it by deleting the entry (stage 340) or by selecting from a list of potential matches (stage 346). If the status is ambiguous because more than one match was found, the user can select from a list of potential matches (stage 346). The resolution process is repeated until all data elements are resolved (decision point 350). When no more data elements remain to be resolved (decision point 350), the process then ends at end point 352.

Figure 6:
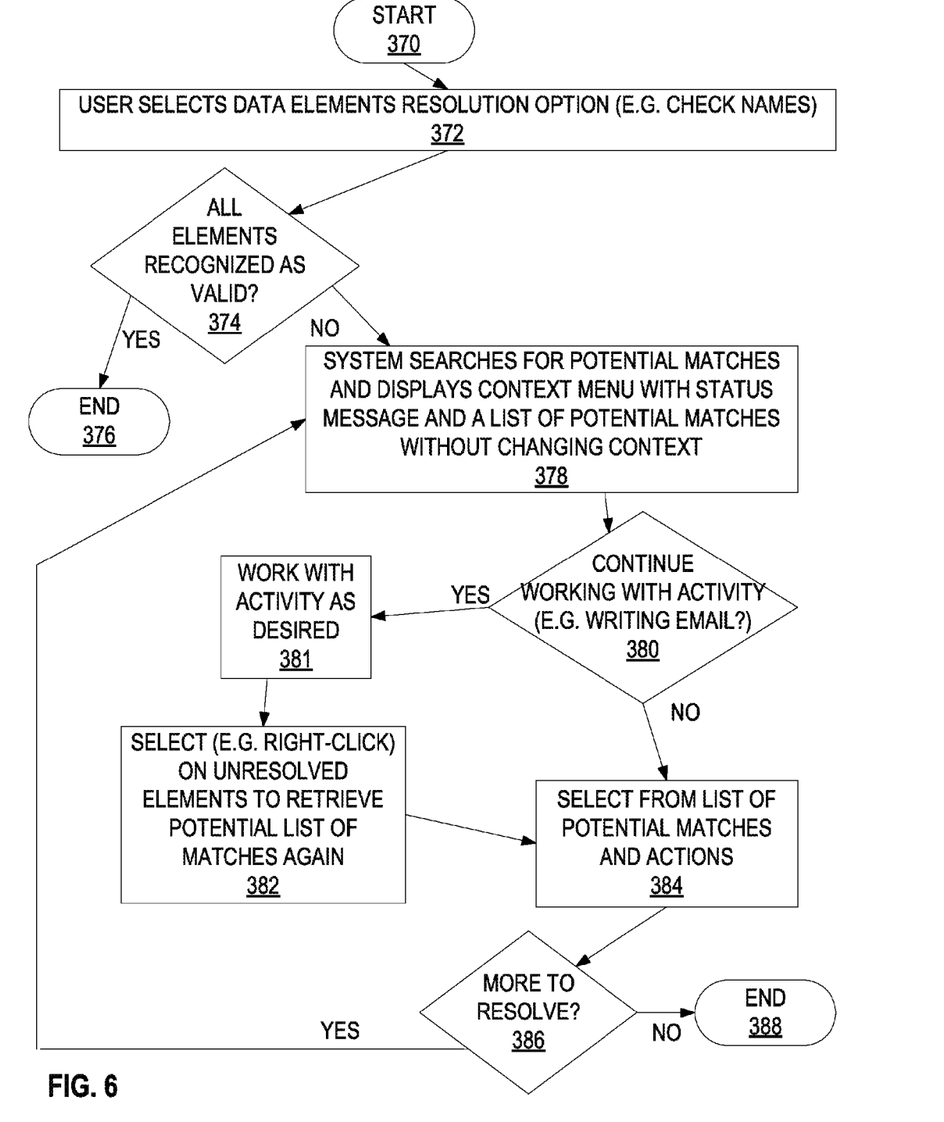
FIG. 6 is a process flow diagram for one implementation of the system of FIG. 1 illustrating the system's stages involved in allowing a user to resume the resolution process later.

FIG. 6 illustrates the process for resuming the resolution process in one implementation in more detail. In one form, the process of FIG. 6 is at least partially implemented in the operating logic of computing device 100. The process starts at start point 370 when the user selects a data element resolution option (e.g. "Check Names") (stage 372) to check the validity of all data elements entered into data element fields (decision point 374). In one implementation, a user enters a particular data element, such as a plain text name, and the system attempts to resolve that data element to an identifier associated with the particular element, such as an email address. In another implementation, the user enters a particular data element and the system attempts to resolve that data element to make sure it matches something that exists. If all data elements are recognized as valid (decision point 374), the process ends at end point 376. If one or more data elements are questionable, or ambiguous, the user will see a context menu (stage 378) displaying a list of potential matches and actions to resolve the ambiguity without requiring the user to change context (e.g. without having to go to another screen, etc.).

If the user wishes to continue working with the activity (e.g. email message) (decision point 380), they can work with it as desired (stage 381). While returning to work with the activity (e.g. email), the user can close the context menu (stage 380) by simply clicking elsewhere in the activity or message, by pressing a designated key or keys (such as Esc), and/or by other methods that cause the context menu to lose focus. The user can return to the context menu any time before attempting to finalize the activity, such as send the email. The resolution process can be resumed later by selecting the unresolved address in a particular fashion (e.g. right-click or other selection) to resolve the potential list of matches (stage 382).

If the user does not wish to exit the resolution process to continue working with the activity (decision point 380), or if the user stops and then resumes the resolution process (stage 382), the user then selects a desired address from the list of potential matches and actions (stage 384).

In one implementation, ambiguous data elements are differentiated from valid data elements by appearing on-screen in a different color and/or by appearing with a dashed underline instead of a solid underline. When the data element is resolved, the user will either be allowed to finalize the activity (e.g. send the email) or resolve the next ambiguous data element (if more than one is present). A new context menu with potential matches and actions will appear in turn for each ambiguous data element. When all data elements are resolved (decision point 386), the process ends at end point 388.

Figure 7:
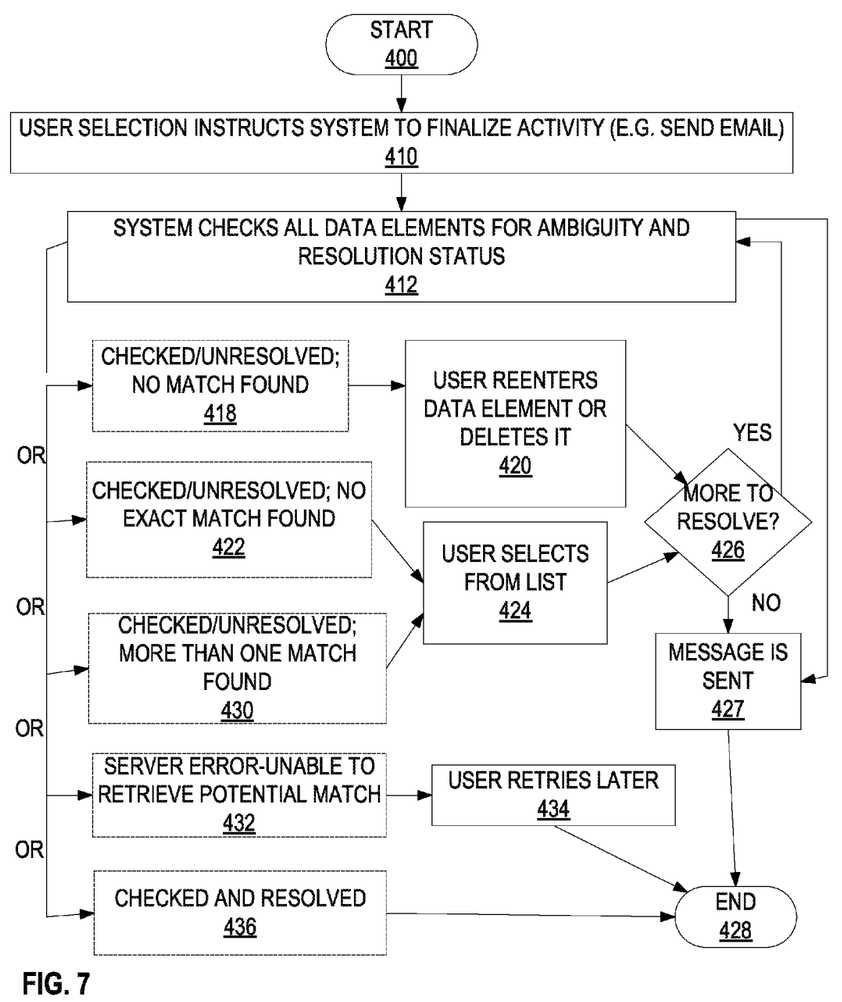
FIG. 7 is a process diagram for one implementation of the system of FIG. 1 that illustrating details of FIG. 6 in the stages involved in the resolution process when a user tries to finalize the activity.

FIG. 7 is a flow diagram for one implementation that illustrates what happens when a user attempts to finalize an activity, such as by attempting to send an email message. In one form, the process of FIG. 7 is at least partially implemented in the operating logic of computing device 100. FIG. 7 begins at start point 400 with the user selecting an option that instructs the system that the user wishes to finalize the activity (e.g. send an email). The system checks all data elements for ambiguity and resolution status (stage 412). The system then displays a context menu consisting of a status message and/or a list of actions that may be taken. Options for actions vary according to whether the system encountered an error in the process, whether the system found no match, one or more partial matches, or more than one exact match.

In one implementation, the system does not check elements until the user activates that feature, such as by selecting a "check names" option. In another implementation, the system checks elements automatically at a pre-determined point in time, such as when the user exits the data element field (e.g. the address field). When the system checks an element and it matches a unique address in the data store, then the address name is considered resolved (stage 436). If a checked element cannot be matched to a data element in the data store (stage 418), the user must delete that name from the address field or reenter the name (stage 420). If one or more partial matches are found (stage 422), or if more than one exact match is found (stage 430), then the user can select the correct data element from a list that appears in the context menu (424). If a network or server error (stage 432) occurs during the checking process, then the user is instructed to try again (stage 434). The process may repeat itself (stage 426) as needed. The process ends at end point 428 when all data elements have been resolved. It will be appreciated that some, all, or additional stages than as listed in the figures herein could be used in alternate embodiments, and/or in a different order than as described.

Turning now to FIGS. 8-11, simulated screens are shown to illustrate a user interface that allows a user to view and interact with an email resolution context menu created using data element resolution application 200. These screens can be displayed to users on output device(s) 111. Furthermore, these screens can receive input from users from input device(s) 112.

Figure 8:
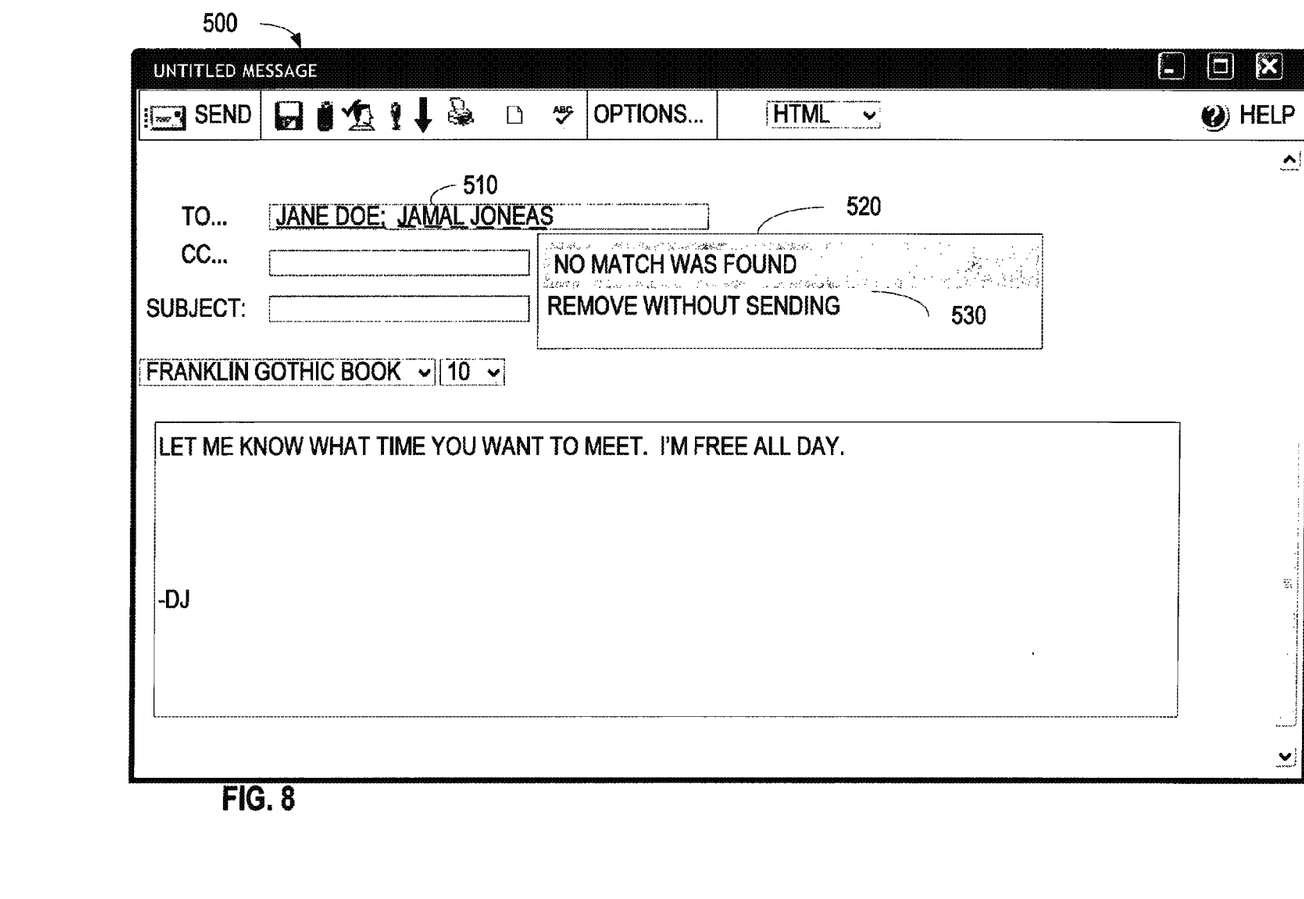
FIG. 8 is a simulated screen for one implementation of the system of FIG. 1 that illustrates user options when no match is found for a user-generated email address entry.

When the user selects the data element resolution option (e.g. "Check Names") (stage 372), the system analyzes all entered data elements against existing data store(s) (stage 324). The results of the analysis appear as a context menu. The information in the context menu can differ, as depicted in FIGS. 8-11. FIG. 8 shows a simulated screen 500 that appears in one implementation when the resolution process cannot find a match for an ambiguous data element 510. The context menu 520 displays one option given for resolving such an address, that is, to remove it without sending the email 530. Clicking on this option deletes the ambiguous address from the address field indicated. Then the user can re-enter an address or send the email.

Figure 9:
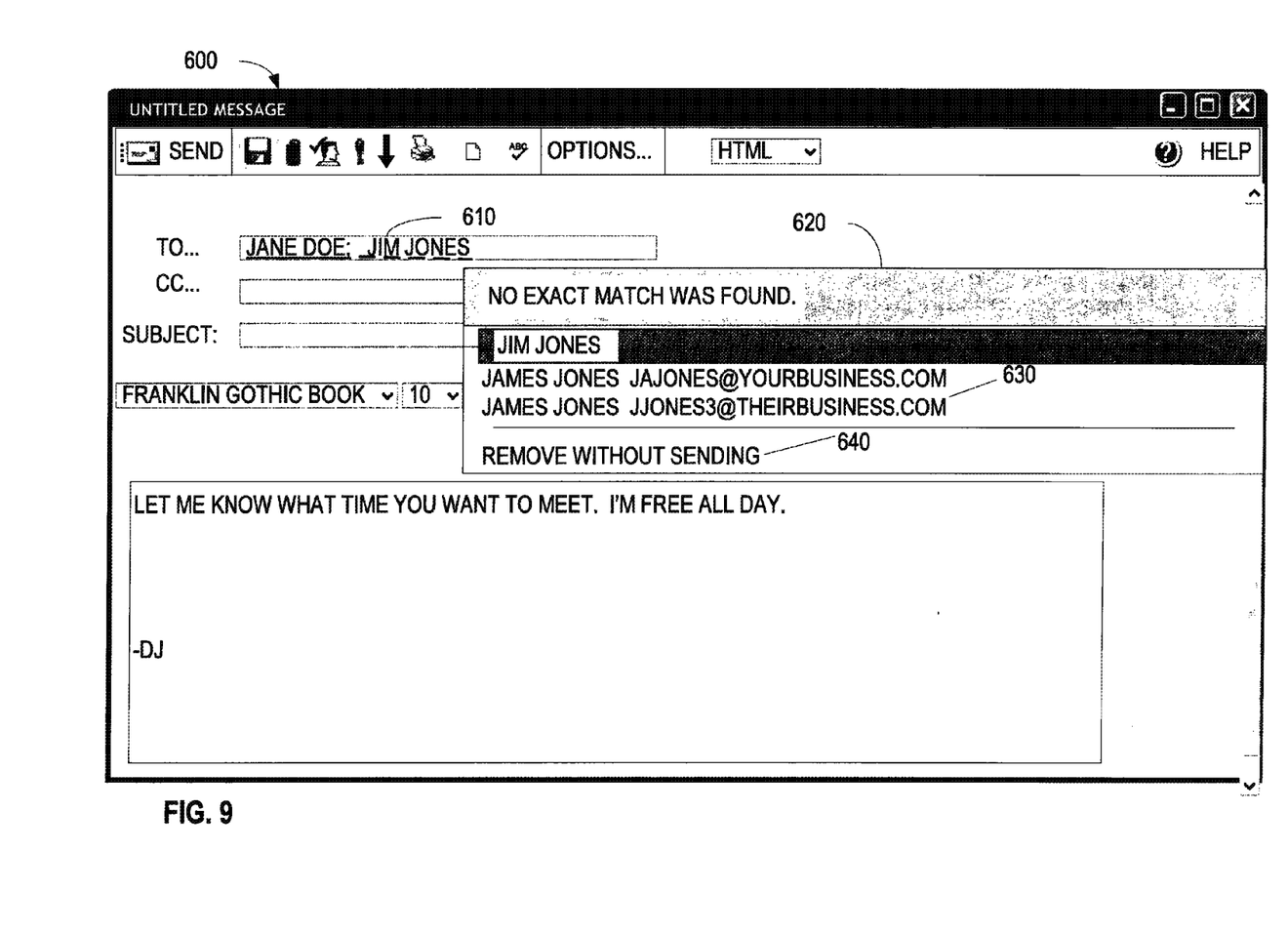
FIG. 9 is a simulated screen for one implementation of the system of FIG. 1 that illustrates user options when no exact match is found for a user-generated email address entry.

FIG. 9 shows a simulated screen 600 of one implementation that appears when the resolution process finds no exact match, but finds partial or potential matches. The context menu 620 displays all potential matches that the user can select from 630, plus the option of removing the data element 640. If the user clicks on an address in the context menu, it replaces the ambiguous address 610.

Figure 10:
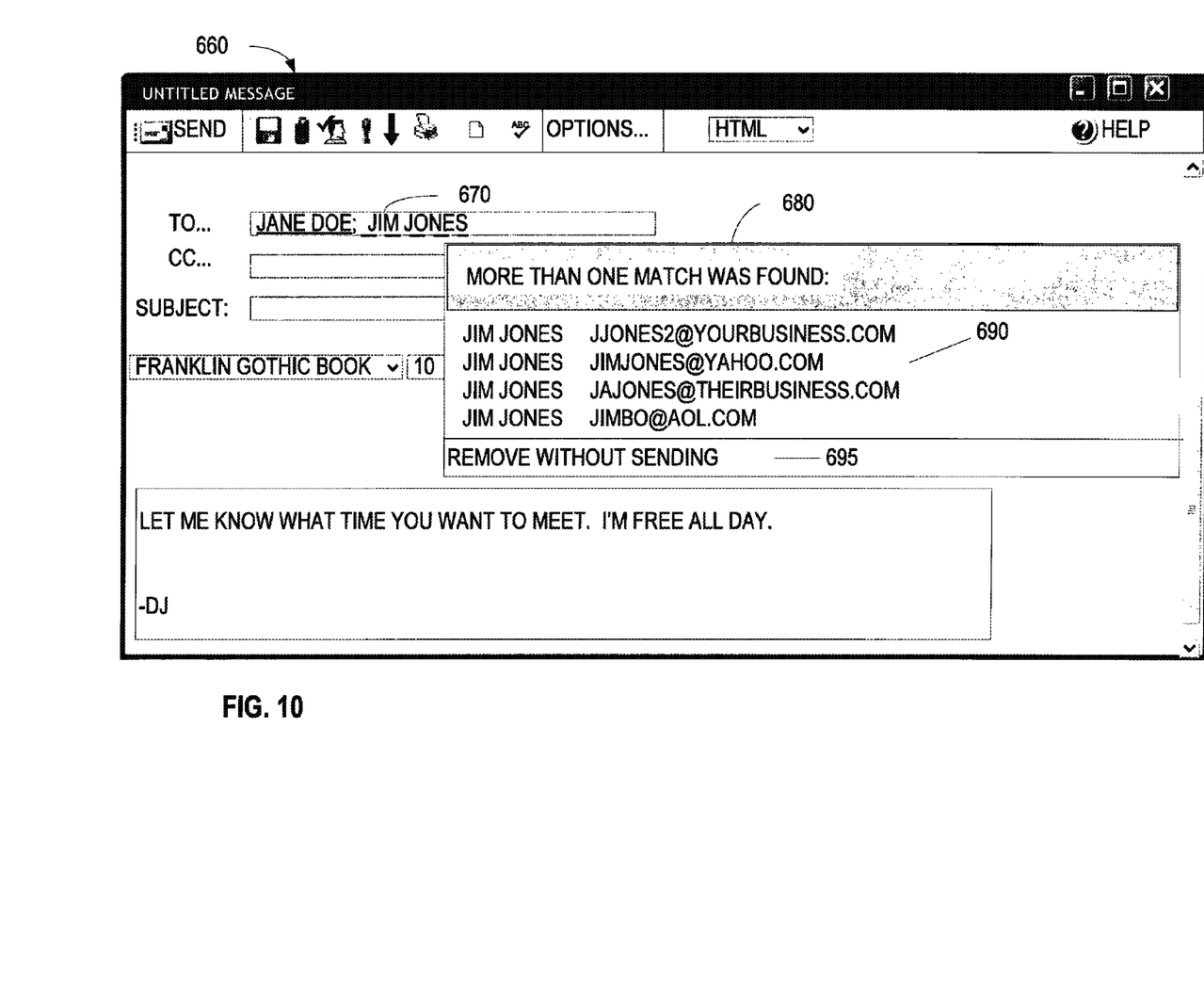
FIG. 10 is a simulated screen for one implementation of the system of FIG. 1 that illustrates user options when more than one match is found for a user-generated email address entry.

FIG. 10 shows a simulated screen 660 of one implementation that appears when the resolution process finds more than one exact match for an ambiguous data element 670. The context menu 680 lists potential matches is seen in 690. If the user clicks on an address in the context menu, it replaces the ambiguous address 670. As in all other context menus, the option for removing the data element is listed 695.

Figure 11:
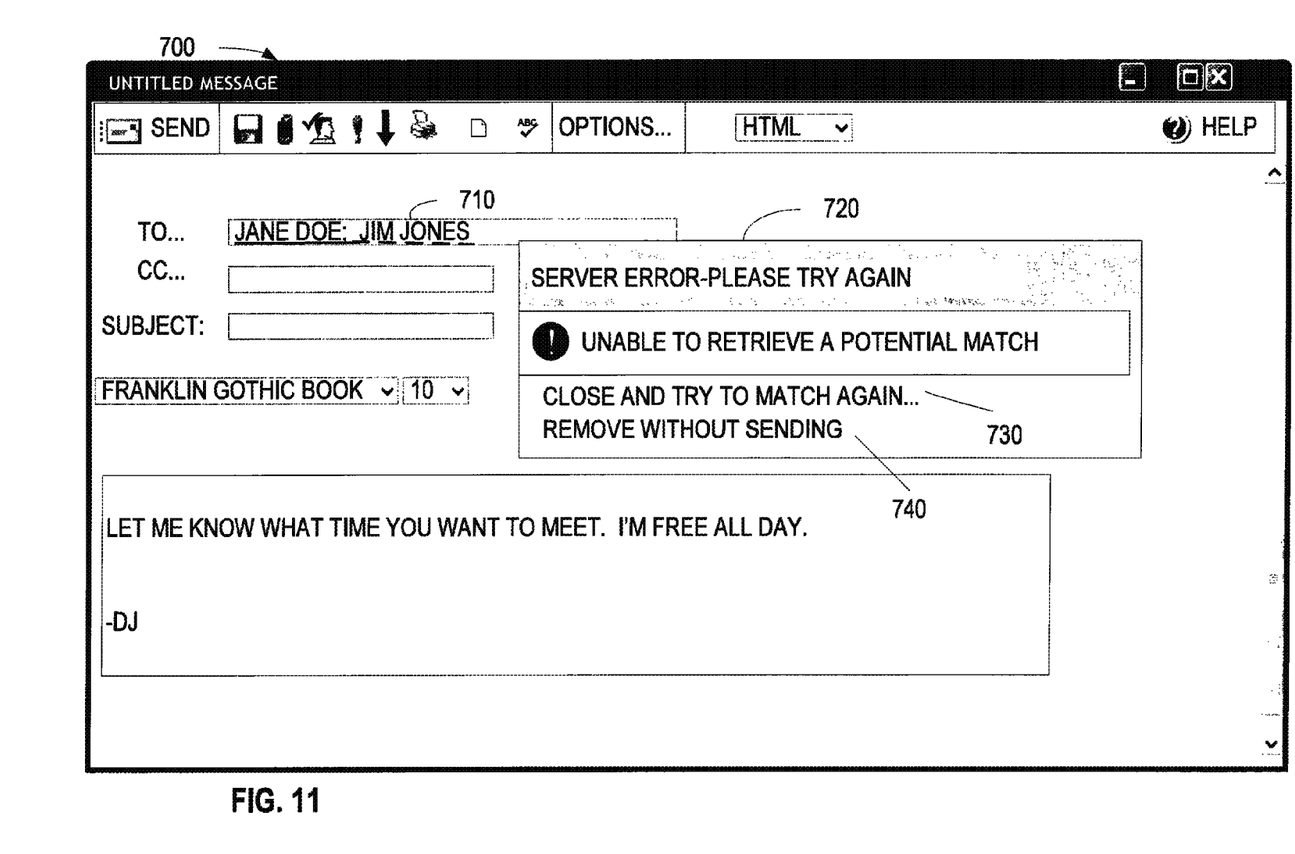
FIG. 11 is a simulated screen for one implementation of the system of FIG. 1 that illustrates user options when a server error is encountered.

FIG. 11 shows a simulated screen 700 of one implementation that appears when a server error occurs. In the event that a system error prevents the analysis of a potential match, the user's options are to close the context menu 720 and try again 730 when system integrity is restored, or to delete the address without sending the email (740). In these simulated screens illustrated in FIGS. 8-11, the resolution context menu is shown within the same context as the rest of the email application, thereby allowing the user to fix the problem without having to go through one or more other screens and/or lose the ability to keep working with the email and resume the resolution process later.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for resolving data elements in-context with an activity, the method comprising:
receiving one or more data elements from a user via a user interface screen for performing an activity;
performing a resolution process that includes:
determining that one of the one or more data elements is unresolved,
retrieving a list of potential matches for the unresolved data element from a data store,
displaying at least a portion of the list of potential matches to the user within the same user interface screen for performing the activity, and
allowing the user to select a corrected data element from the displayed at least a portion of the list; and
allowing the user to stop the resolution process to continue working with the user interface screen for performing the activity and later complete the resolution process in the same user interface screen.

2. The method of claim 1, wherein receiving the one or more data elements from the user via the user interface screen for performing the activity comprises:
receiving the one or more data elements from the user via a user interface screen for creating a message.

3. The method of claim 1, wherein retrieving the list of potential matches for the unresolved data element from the data store comprises:
contacting a web server to retrieve the list of potential matches for the unresolved data element from the data store.

4. The method of claim 1, wherein receiving the one or more data elements comprises:
receiving one or more email addresses.

5. The method of claim 1, wherein receiving the one or more data elements comprises:
receiving one or more postal addresses.

6. The method of claim 1, wherein allowing the user to later complete the resolution process comprises:
allowing the user to later complete the resolution process by selecting the unresolved data element.

7. The method of claim 1, wherein displaying the at least a portion of the list of potential matches to the user in the same user interface screen for performing the activity comprises:
displaying the at least a portion of the list of potential matches to the user in a menu within the same user interface screen for performing the activity.

8. The method of claim 1, wherein retrieving the list of potential matches for the unresolved data element comprises:
retrieving one or more data elements that do not exactly match the unresolved data element.

9. The method of claim 1, wherein retrieving the list of potential matches for the unresolved data element comprises:
retrieving a plurality of data elements that exactly match the unresolved data element.

10. A computer-readable storage device having computer-executable instructions for causing a computer to perform steps comprising:
checking a data element entered by a user via a user interface screen for performing an activity and determining if the data element is unresolved;
if the data element is determined to be unresolved, performing a resolution process comprising:
identifying one or more possible matching data elements for the unresolved data element;
displaying the one or more possible matching data elements in the same user interface screen for performing the activity;
allowing the user to stop the resolution process to continue performing the activity and later complete the resolution process in the same user interface screen for performing the activity; and
allowing the user to finalize the activity once the unresolved data element is resolved.

11. The computer-readable storage device of claim 10, wherein the data element is an email address.

12. The computer-readable storage device of claim 10, wherein the data element is a postal address.

13. The computer-readable storage device of claim 10, wherein allowing the user to later complete the resolution process comprises:
allowing the user to later complete the resolution process by selecting the unresolved data element.

14. The computer-readable storage device of claim 10, wherein displaying the one or more possible matching data elements for the unresolved data element in the same user interface screen for performing the activity comprises:

displaying the one or more possible matching data elements for the unresolved data element in a menu in the same user interface screen for performing the activity.

15. The computer-readable storage device of claim 10, wherein identifying the one or more possible matching data elements for the unresolved data element comprises:

identifying one or more data elements that do not exactly match the unresolved data element.

16. The computer-readable storage device of claim 10, wherein identifying the one or more possible matching data elements for the unresolved data element comprises:

identifying a plurality of data elements that exactly match the unresolved data element.

17. The computer-readable storage device of claim 10, wherein the activity is creating a message and wherein allowing the user to finalize the activity once the unresolved data element is resolved comprises allowing the user to send the message once the unresolved data element is resolved.

18. A method for resolving email addresses in-context with an email message comprising the steps of:

checking an email address entered by a user via a user interface screen for creating an email message and determining if the email address is unresolved;

if the email address is unresolved, performing a resolution process comprising:

determining that one or more possible matching data elements are available for the unresolved email address;

displaying the one or more possible matching data elements in the user interface screen for creating the email message;

allowing the user to resolve the email address by selecting one of the one or more potential data elements displayed in the user interface screen for creating the email message;

allowing the user to stop the resolution process to continue working with the user interface screen for creating the email message and later complete the resolution process in the same user interface screen; and allowing the user to send the email message once the unresolved email address is resolved.

19. The method of claim 18, wherein determining that one or more possible matching data elements are available for the unresolved email address comprises:

identifying one or more email addresses that do not exactly match the unresolved email address.

20. The method of claim 18, wherein determining that one or more possible matching data elements are available for the unresolved email address comprises:

identifying a plurality of email addresses that exactly match the unresolved email address.

\* \* \* \* \*